United States Patent [19]

Goans

[11] Patent Number: 5,022,785
[45] Date of Patent: Jun. 11, 1991

[54] FLOATING BARRIER METHOD AND APPARATUS

[75] Inventor: Kip B. Goans, Harvey, La.

[73] Assignee: Richard J. Lazes, Harvey, La.

[21] Appl. No.: 424,158

[22] Filed: Oct. 19, 1989

[51] Int. Cl.$^5$ .......................................... E02B 15/06
[52] U.S. Cl. ........................................ 405/69; 441/31
[58] Field of Search ................ 405/68, 69, 63–67, 405/70–71; 441/31

[56] References Cited

U.S. PATENT DOCUMENTS

| | | | |
|---|---|---|---|
| 2,682,151 | 6/1954 | Simpson et al. | 405/68 |
| 3,494,132 | 2/1970 | Logan | 405/68 |
| 3,503,512 | 3/1970 | Desty et al. | 405/68 X |
| 3,563,036 | 2/1971 | Smith et al. | 405/70 X |
| 3,701,259 | 10/1972 | Heartness | 405/69 |
| 3,792,589 | 2/1974 | Sayles | 405/68 |
| 4,123,911 | 11/1978 | Finigan et al. | 405/68 |
| 4,325,653 | 4/1982 | Teasdale | 405/68 |

FOREIGN PATENT DOCUMENTS

| | | | |
|---|---|---|---|
| 1529754 | 6/1968 | France | 405/63 |
| 1413812 | 11/1975 | United Kingdom | 405/63 |

Primary Examiner—Dennis L. Taylor
Assistant Examiner—Arlen L. Olsen
Attorney, Agent, or Firm—Jackson & Walker

[57] ABSTRACT

A boom for collecting material floating on the surface of a body of water comprises a first collapsible tube which can be stored either as flat layers of folded material or by rolling it on a roller. Transverse seals are provided along the length of the tube to provide a longitudinal sequence of compartments. A reactant body is disposed in at least one compartment, and being capable of producing an inflating gas. The reactant body is disposed within a pouch which is frangible under pressures applied by rollers or the like during the deployment of the boom from its stored condition. In a modification, a small collapsible tube is provided in longitudinally secured relationship to the first tube and the interior of the small tube is provided with fluid connections to each of the successive compartments. Pressured air is then applied to the first off end of the small tube to supply pressured gas to all of the compartments, thus inflating any compartment that is underinflated by the gas produced by the reactant body.

10 Claims, 2 Drawing Sheets

FLOATING BARRIER METHOD AND APPARATUS

BACKGROUND OF THE INVENTION

1. Field of the Invention

The invention relates to a method and apparatus for creating a floating boom for collecting floatable material, such as liquid hydrocarbons, floating on the surface of a body of water.

2. Summary of the Prior Art

Conventional oil booms normally comprise an elongate tubular body, generally produced by inflation of a fluid impervious tube to which is secured a depending, oil confining skirt. These booms are normally stored on land or on ship in a collapsed state, either by flat folding the collapsed tube or by rolling the collapsed tube on a reel. See, for example, U.S. Pat. Nos. 2,682,151 and 3,494,132 which disclose a series of inflatable plastic tubes, the ends of which are interconnected by sleeves. Integrally formed on each tube is a depending hollow fin having a weighted material such as lead shot contained in the lower longitudinal edge of the fin.

U.S. Pat. No. 4,123,911 discloses a continuous inflatable tube. One end of the continuous tube is affixed to the deployment vessel and supplied with pressured air to effect its inflation. The second end of the tube, after it is fully deployed from the transport vessel on which it was originally stored, is then attached to either a second vessel or to a drogue or some similar means of stationing the second end of the barrier in the sea.

U.S. Pat. No. 4,325,653 provides a collapsible boom which, in its inflated condition, has double buoyancy chambers disposed on each side of a central skirt member. A tension wire is secured to the lower skirt region and two pressurizing hoses are secured to the upper skirt region above the buoyancy chambers. Inflation air is then supplied through the pressurizing air hoses with the preferable arrangement being stated to be the utilization of separate air hoses respectively supplying the individual buoyancy chambers. Pressured air is supplied to the air hoses from an external source via a rotary gland fitted at the reel core axis.

Each of the aforementioned prior art patents has the disadvantage that a leak developing in the inflatable tube can cause severe problems in maintaining the buoyancy of the boom.

An attempt was made to overcome this problem in U.S. Pat. No. 3,792,589 by providing a collapsible boom having a series of longitudinally separated inflatable compartments. Each of these compartments necessarily had to be separately filled through an individual valve as the collapsed tube was dispensed from a storage reel. This obviously greatly increased the time required for effecting the deployment of the boom.

The prior art has failed to disclose a rapidly deployable hydrocarbon retaining boom wherein the collapsible tube forming the boom has longitudinally spaced inflatable compartments insuring that a leak in one compartment does not adversely affect the functioning of the entire boom.

SUMMARY OF THE INVENTION

The invention comprises a collapsible, inflatable boom for confining hydrocarbons and other materials floatable on a liquid surface, such as body of water, wherein a fluid impervious inflatable tubular element of the boom is provided at longitudinally spaced intervals with transverse seals, thus separating the inflatable tube into a plurality of successive inflatable compartments. Within each compartment, a reactant body is placed prior to the sealing of the compartment, such chemicals of the type that, when mixed, will react to produce a gas in sufficient volume to effect the inflation of the respective compartment. For example, the chemicals could comprise sodium carbonate and acetic acid. By use of the term "reactant body", it is meant to refer to and include any chemical, chemicals or chemical compositions which when reacted or otherwise activated produce in situ an inflation gas for the compartments.

In a preferred embodiment, to prevent the premature mixing of the gas producing chemicals, the reactant body is enclosed in pouches which are mounted within at least one, and preferably each of the compartments and preferably sealably secured at a fixed location in such compartments. Such pouches are preferably utilized to contain liquid chemical, and when thus contained, presents a total thickness greater than the thickness of the collapsed tube. Thus, the passage of the tube through a set of compression rollers as a preliminary to deployment of the tube into the body of water will effect the successive rupture of the pouches, resulting in the initiation of the reactant body in the compartments and the successive inflation of the compartments as the plastic tube is deployed through the compression rollers.

As is known in the art, it is desirable that the inflatable tube be provided with a depending fin which is suitably weighted so as to maintain a substantially vertical position in the body of water, thus provided a barrier for the hydrocarbons or other material floating on the surface. In accordance with this invention, such barrier is provided by a second collapsible fluid impervious tube which is longitudinally secured to one edge of the compartmented tube and hence deployed into the water concurrently with the compartmented tube. The second tube is provided with a plurality of transverse seals dividing the interior of the tube into successive compartments. Each compartment, prior to the sealing thereof, is provided with a quantity of particulate material having a specific gravity substantially in excess of that of water, such as sand or gravel, which gravitates to the bottom of the second tube which is not inflated. Thus, the second tube is maintained in a substantially planar configuration depending from the inflated tube when the tubes are deployed into the body of water.

In the event that the reactant body in one or more of the chemical containing compartments of the first mentioned tube is not activated to provided sufficient gas to effect the inflation of the particular compartment, a modification of this invention provides a third small diameter collapsible tube which is longitudinally secured along the first tube and is provided with a plurality of transversely disposed, collapsible plastic tubes respectively communicating between the bore of the small tube and the interiors of the compartments. After the collapsed boom is fully deployed into the water, the deployed or first off end of the small diameter third tube may be supplied with pressured air from an external source. Thus, each of the separate compartments is insured of being adequately inflated. Through the utilization of collapsible plastic tubes as the conduit connection between the pressured air tube and the compartmented first tube, the ends of such plastic tubes function as a check valve so that those compartments which achieve normal inflation through the activation of the reactant body to effect the compression of the flat ends of the connecting tubes and prevent any loss of the inflating gas through such tubes, but provide a secondary means for inflating any improperly filled compartments.

Those skilled in the art will recognize that the aforedescribed arrangement permits the rapid deployment of a hydrocarbon retaining boom onto a body of water with the inflation of the boom being effected by a plurality of longitudinally separate compartments. Thus, the development of a leak in any one compartment will not adversely affect the performance of the boom. The method and apparatus of this invention has the further advantage that the materials employed are very inexpensive and hence the boom, once used, does not have to be cleaned and stored for reuse. The cleaning of hydrocarbon collecting booms is, as is well known, a laborious and expensive procedure. Additionally, ruptures of the inflatable elements have to be repaired. A single use boom constructed in accordance with this invention eliminates such cleaning and repair operations and results in a total cost of the hydrocarbon collecting operation not significantly different than that involved in the multiple use of the conventional prior art booms.

Further advantages of the invention will be readily apparent to those skilled in the art from the following detailed description, taken in conjunction with the annexed sheets of drawings, on which are shown several preferred embodiments of the invention.

BRIEF DESCRIPTION OF DRAWINGS

FIG. 1 and FIG. 2 are incorporated in the resulting boom.

DESCRIPTION OF PREFERRED EMBODIMENTS

Figure 1:
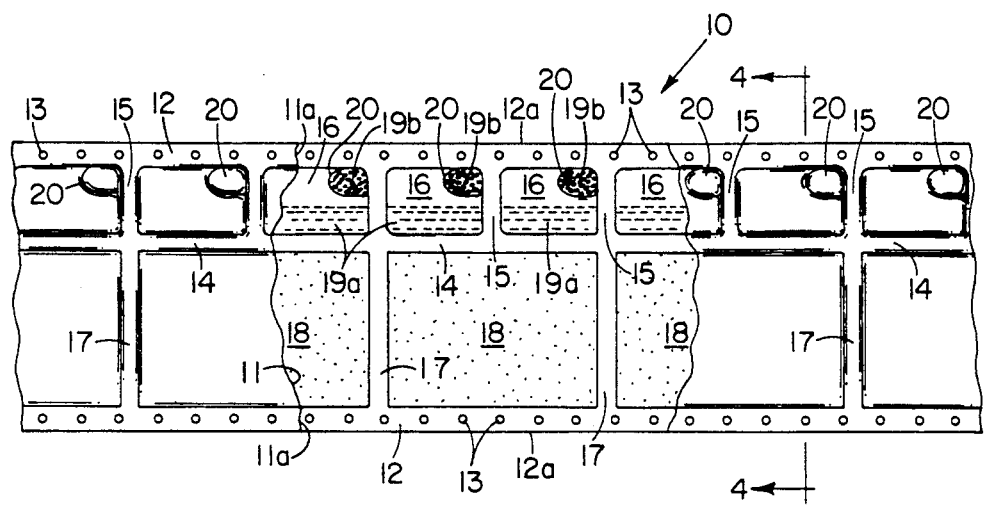
FIG. 1 is an elevational view, partly in section, of a longitudinal portion of a hydrocarbon collecting boom embodying this invention.

Referring to FIG. 1, a boom 10 embodying a first modification of this invention comprises, in its collapsed form, top and bottom walls of an inflatable tube formed of fluid impervious material, which are secured together by heat sealing at their longitudinal edges 11a and 12a. Such edges are provided with a plurality of punched holes 13 by which the resulting collapsed tubular structure may be expeditiously fed by sprocket wheels during the deployment operation.

In addition to sealing, such as by heat, of the longitudinal edges 11a and 12a a longitudinally extending heat seal 14 is provided intermediate the longitudinally sealed edges. Transverse heat seals 15 are then provided interconnecting the longitudinal heat seal 14 with the top longitudinally sealed edge and dividing the upper portion of the boom assemblage into a plurality of longitudinally successive compartments 16. Additionally, transversely extending heat seals 17 are provided connecting the longitudinal heat seal 14 with the bottom longitudinal edge seal, thus defining a series of substantially larger longitudinally adjacent compartments 18. Each of the compartments 18 is filled with a granular material, such as sand or gravel, having a specific gravity substantially in excess of that of water and thus the successively connected compartments 18 define a depending fin when the boom is deployed onto a body of water.

Figure 6:
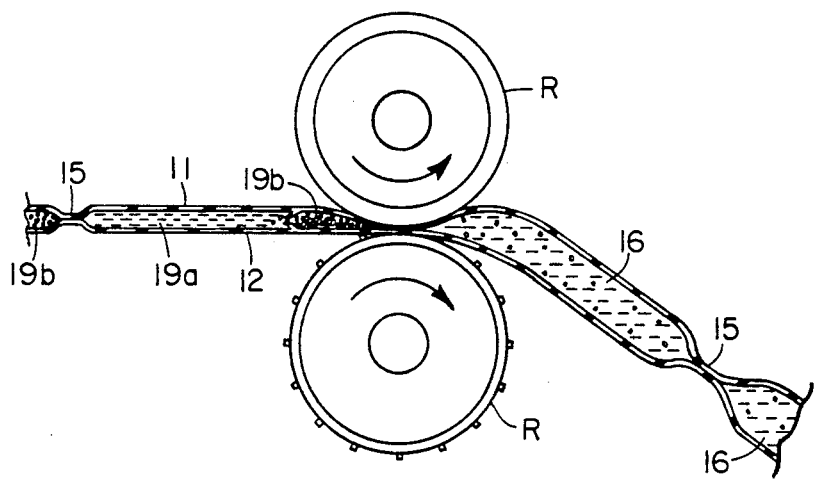
FIG. 6 is a schematic view illustrating the compression of the boom of FIGS. 1 or 3 during the deployment thereof.

Within each of the compartments 16, a plurality of chemicals are disposed which, when mixed, react to produce a gas. For example, the chemicals can comprise granular sodium carbonate 19a and liquid acetic acid 19b, which when mixed, will produce significant quantities of carbon dioxide gas. In accordance with this invention, one of the chemicals, preferably the liquid chemical is enclosed within a small plastic pouch 20 which is tack sealed in a desired position within each of the chambers 16. The liquid containing pouches are preferably disposed in longitudinal alignment and are filled with the liquid chemical to the extent that the thickness of each pouch 20 exceeds that of the collapsed boom 10. Accordingly, when the boom 10 is passed through a pair of compressive rollers in the manner indicated in FIG. 6, the pouches 20 will be successively ruptured and the liquid chemical 19b contained therein will be released to mix with the granulated chemical 19a and produce sufficient carbon dioxide gas to effect the inflation of each of the chambers 16 as the boom 10 is deployed.

Obviously, with the chemical generation of the inflating gas in each of the longitudinally adjacent sealed compartments 16, the boom is deployed without the delays that have been heretofore imposed on prior art structures of laboriously connecting a source of pressured air to each of the inflatable longitudinally adjacent compartments.

Figure 2:
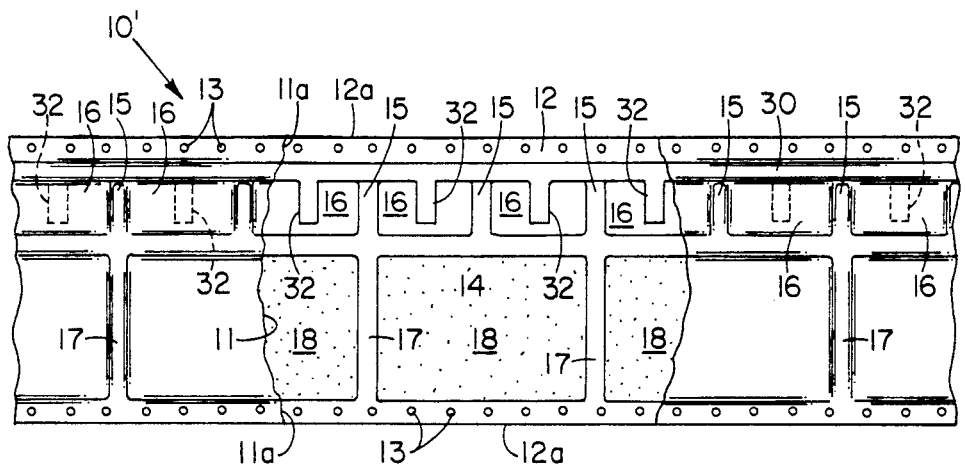
FIG. 2 is a view similar to FIG. 1 but illustrating a modification of this invention.

Referring now to FIG. 2 wherein similar numerals represent structures similar to those disclosed in FIG. 1, there is shown a boom 10' having a plurality of longitudinally spaced sealed compartments 16. No chemicals are provided in the compartments 16, however, and the inflation of the individual compartments 16 is accomplished by the incorporation in the boom structure of a longitudinally extending, collapsible tube 30 which is provided with a plurality of transversely disposed connecting tubes 32 which respectively extend into each of the compartments 16.

When this type of boom is deployed into the water, the inflation of the longitudinally adjacent compartments 16 is accomplished by applying pressured air to the first-off end of the small diameter tube 30. Such pressured air is supplied through the transverse connecting tubes 32 to each of the longitudinally adjacent sealed compartments 16, thus effecting the inflation of these compartments so long as the fluid pressure is maintained in the small tube 30. The depending fin for this boom is formed in exactly the same manner as previously described in connection with FIG. 1 by sealably provided a plurality of adjacent compartments 18 containing sand or gravel to effect the weighting of the compartments so that they maintain their collapsed condition and function as a fin projecting into the water beneath the inflated portions 16.

Figure 3:
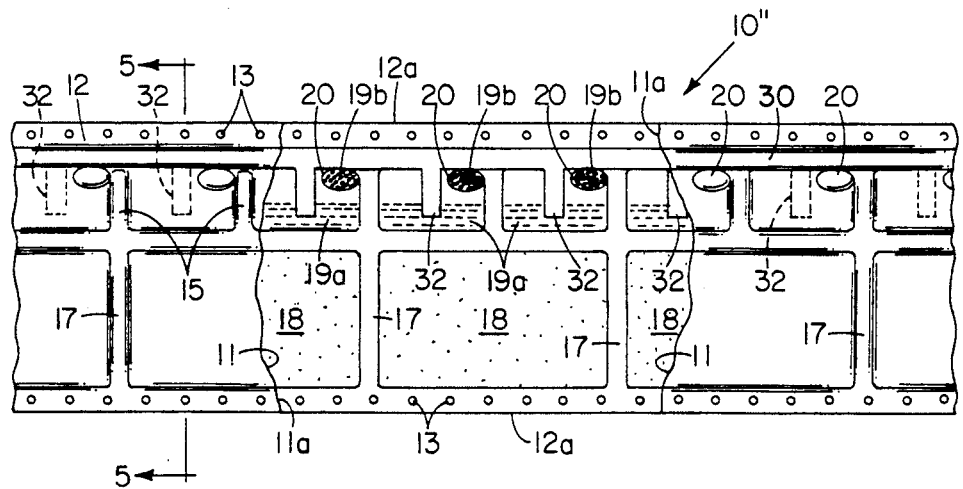
FIG. 3 is a view similar to FIG. 1 but illustrating a second modification of, this invention wherein the elements of both
Figure 4:
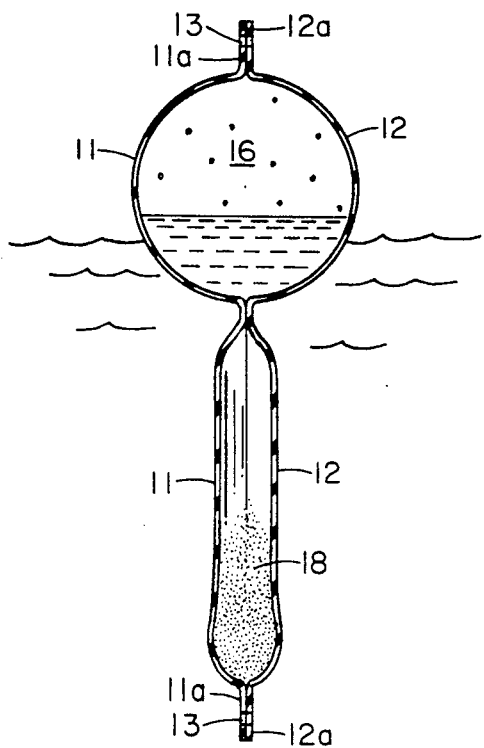
FIG. 4 is a sectional view taken on the plane 4—4 of FIG. 1.
Figure 5:
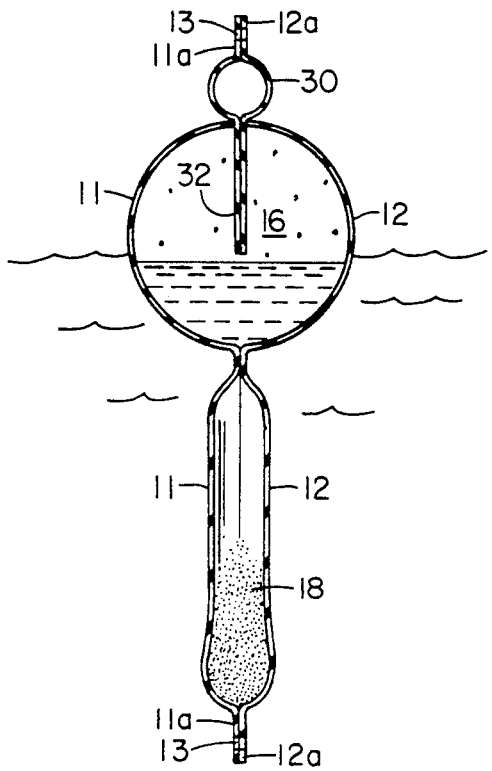
FIG. 5 is sectional view taken on the plane 5—5 of FIG. 3.

Referring now to FIG. 3 there is shown a still further modification of this invention comprising a boom 10" which incorporates both of the inflation features of the boom 10 of FIG. 1 and boom 10' of FIG. 2. Similar numerals in FIG. 3 represent parts identical to those previously described in connection with FIGS. 1 and 2. Thus, the modification of FIG. 3 employs a mixture of chemicals 19a and 19b contained within each of the longitudinally adjacent compartments 16 to initially effect the inflation of compartments 16 by the rupturing of the pouch 20 containing the chemical liquid component 19b. The mixture of the liquid chemical component with the granulated component results in the production of sufficient gas to inflate the respective longitudinally adjacent sealed compartments 16.

The advantage of the modification of FIG. 3 lies in the fact that if, for any reason, the mixed chemicals fail to produce sufficient gas to effect the inflation of a particular compartment, such compartment can be inflated by pressured air supplied through the first-off end of the small diameter tube 30 and through the connecting tube 32 extending into the particular compartment. Thus, it can be assured that all compartments 16 are inflated. Those compartments wherein adequate inflation is accomplished by the gases produced by the chemical reaction of the mixed chemicals, are effectively isolated from the air pressure existing in the small diameter tube 30 because the internal pressure in each gas inflated compartment 16 will squeeze the flat ends of the connecting tubes 32 together to prevent leakage through such tubes. Connecting tubes 32 thus function as check valves.

Those skilled in the art will recognize that the various modifications of hydrocarbon collecting booms heretofore described each have the unique advantage of permitting very rapid deployment of the boom into the water and with the assurance that the inflation of all of the longitudinally adjacent sealed compartments can be accomplished during the deployment. Since each of the inflated compartments is relatively small, a leak developing in one compartment will not adversely effect the functioning of the boom.

It will also be noted that the herein described hydrocarbon collecting booms are specifically designed for single use applications and employ very economical materials which significantly reduce costs of the boom over that of reusable booms. There is the further cost mitigating cost circumstance that the rapid deployment capability of booms embodying this invention may well result in substantially reducing the time for entrapping an oil spill on a body of water and the dollar value of this time is very significant from an environmental standpoint.

It will also be recognized that each of the aforedescribed booms can be compactly stored in a folded flat condition on a vessel or wound in a flat collapsed condition on a reel. Either way, the speed of deployment of the boom is not adversely affected.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An inflatable float boom for confining material floatable on a liquid surface, comprising, in combination:
   an elongated collapsible member formed of fluid impervious materials;
   said collapsible member defining a flat reelable configuration when collapsed;
   sealing means separating the interior of the collapsible member into a plurality of float boom inflation compartments sequentially disposed along the length of said collapsible member;
   means for generating float boom inflating gas for inflation of said compartments comprising a first and second substance;
   said compartments comprising a plurality of chambers when said float boom is in a pre-deployed position, each of said chambers containing one of said first or second substances; and
   wherein upon deployment of said float boom, at least one of said chambers being openable by a compressive force applied to at least one side of said collapsible member thereby mixing the first and second substance and generating said inflation gas.

2. The apparatus of claim 1 wherein said compartments are successively openable by being ruptured by a compressive force successively applied to opposed sides of said first collapsible member thereby activating the means for generating gas.

3. The apparatus of claim 1 wherein said pouch members are openable for a compressive force applied to the first collapsible member when said collapsible member is in a flat reelable configuration while in said predeployed position.

4. An inflatable float boom for confining material floatable on a liquid surface, comprising, in combination:
   an elongated collapsible tube formed of fluid impervious material;
   said first tube defining a flat reelable configuration when collapsed;
   sealing means separating the interior of the collapsible tube into a plurality of float boom inflation compartments sequentially disposed along the length of said tube;
   internal inflation generating means comprising a first and second substance;
   said compartments comprising a plurality of chambers when said float boom is in a pre-deployed position, each of said chambers containing one of said first or second substances; and
   wherein upon deployment of said float boom, at least one of said chambers in said compartments being successively rupturable by compressive force successively applied to the exterior of the tube in its flat collapsed condition, thereby effecting the mixing the first and second substance to generate said inflation gas.

5. A float boom for confining material floatable on a liquid surface comprising, in combination:
   a first elongated collapsible tube formed of fluid impervious material;
   said first tube defining a flat, reelable configuration when collapsed;
   sealing means separating the interior of said first tube into a plurality of adjacent compartments sequentially disposed along the length of said first tube;

a second elongated collapsible tube formed of fluid impervious material and defining a flat reelable configuration when collapsed;

said second tube having a substantially smaller diameter when expanded than said first tube;

said sealing means longitudinally securing said second tube to said first tube; and a plurality of conduits spaced along the length of said second tube and respectively communicating between the bore of said second tube and said compartments, whereby pressured gas supplied to an end of the stored second tube produces successive inflation of said compartments.

6. The apparatus of claim 5 wherein said conduits have normally collapsed end portions within said compartments, thereby functioning as check valves.

7. The apparatus of claim 5 or 6 further comprising a third elongated collapsible tube formed of fluid impervious material;

said third tube defining a flat reelable configuration when collapsed;

means for sealingly securing a longitudinal edge of said third tube to said first tube;

third sealing means dividing the interior of said third tube into a plurality of adjacent chambers extending along the length of said third tube; and a selected quantity of particulate material disposed in each said chamber, said particulate material having a specific gravity substantially greater than that of water.

8. The apparatus of claim 5 further comprising:

a plurality of chemicals disposed in each said compartment in separated relationship;

said chemicals when mixed being capable of producing a quantity of gas sufficient to inflate the respective compartment;

a pouch in each compartment enclosing one of said chemicals;

said pouches being successively rupturable by a compressive force successively applied to opposed sides of said first tube in its flat collapsed condition, whereby inflation of said compartments can be effected initially by said gas produced by mixture of said chemicals or subsequently by pressured gas supplied to an end of the stored second tube.

9. The apparatus of claim 8 wherein said pouches have normally collapsed end portions within said compartments, thereby functioning as check valves.

10. The method of inflating a collapsed floatable boom for collecting hydrocarbons floating on a body of water, said boom comprising an elongated tube of fluid impervious material storable in reel form when collapsed, comprising the steps of:

(1) dividing the interior of said tube into a plurality of longitudinally sequential compartments;

(2) providing a second collapsible, fluid impervious tube longitudinally secured to said first tube and having fluid connections to each of said compartments;

(3) inserting in each of said compartments a reactant body to produce an inflation gas;

(4) enclosing said reactant body in a frangible fluid impervious pouch;

(5) crushing each of said frangible pouch by a compressive force applied while removing said tube from the storage reel, thereby successively inflating said compartments by the inflation gas produced by said reactant body; and (6) supplying a pressured gas to an end of said second tube to inflate any of said compartments that are not fully inflated by the produced gas.

* * * * *